United States Patent
Feulner

(10) Patent No.: US 10,457,401 B2
(45) Date of Patent: Oct. 29, 2019

(54) DUAL-USE AIR TURBINE SYSTEM FOR A GAS TURBINE ENGINE

(71) Applicant: United Technologies Corporation, Farmington, CT (US)

(72) Inventor: Matthew R. Feulner, West Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 877 days.

(21) Appl. No.: 15/153,837

(22) Filed: May 13, 2016

(65) Prior Publication Data

US 2017/0327235 A1    Nov. 16, 2017

(51) Int. Cl.
 *B64D 13/08*  (2006.01)
 *B64D 15/04*  (2006.01)
 (Continued)

(52) U.S. Cl.
 CPC ............. *B64D 13/08* (2013.01); *B64D 13/06* (2013.01); *B64D 15/04* (2013.01); *B64F 1/34* (2013.01); *F02C 1/02* (2013.01); *F02C 3/04* (2013.01); *F02C 6/08* (2013.01); *F02C 7/277* (2013.01); *B64D 2013/0618* (2013.01); *B64D 2013/0648* (2013.01); *F05D 2220/32* (2013.01);
 (Continued)

(58) Field of Classification Search
 CPC ..................... B64D 13/08; B64D 15/04; B64D 2013/0648; B64F 1/34; F02C 1/02; F02C 3/04; F02C 6/08; F02C 7/277; F05D 2220/32; F05D 2250/90; F05D 2260/4031; F05D 2260/606; F05D 2260/85
 See application file for complete search history.

(56) References Cited

U.S. PATENT DOCUMENTS 2,692,476 A * 10/1954 Lawler ................ F01D 1/30
 417/324
3,029,804 A *  4/1962 Dillon, Jr. .............. B64F 1/34
 126/110 R
(Continued)

FOREIGN PATENT DOCUMENTS

WO        0123724        4/2001

OTHER PUBLICATIONS

EP Application No. 17171127.8 Search Report dated Sep. 22, 2017, 8 pages.
(Continued)

*Primary Examiner* — Aaron R Eastman
(74) *Attorney, Agent, or Firm* — Cantor Colburn LLP

(57) ABSTRACT

A dual-use air turbine system for a gas turbine engine of an aircraft is provided. The dual-use air turbine system includes a variable area air turbine mechanically linked to a spool of the gas turbine engine through a multi-speed gear set. The dual-use air turbine system also includes a plurality of valves in pneumatic ducting operable to direct an engine start air flow through an inlet of the variable area air turbine and drive rotation of the spool during an engine start mode of operation. The valves are further operable to direct an engine bleed air flow from a compressor section of the gas turbine engine through the inlet of the variable area air turbine and drive rotation of the spool during an environmental control system active mode of operation.

16 Claims, 3 Drawing Sheets

(51) Int. Cl.
*B64F 1/34* (2006.01)
*F02C 3/04* (2006.01)
*F02C 7/277* (2006.01)
*F02C 1/02* (2006.01)
*F02C 6/08* (2006.01)
*B64D 13/06* (2006.01)

(52) U.S. Cl.
CPC .. *F05D 2250/90* (2013.01); *F05D 2260/4031* (2013.01); *F05D 2260/606* (2013.01); *F05D 2260/85* (2013.01)

(56) References Cited

U.S. PATENT DOCUMENTS

| | | | | |
|---|---|---|---|---|
| 5,114,103 A | * | 5/1992 | Coffinberry | B64C 21/06 244/118.5 |
| 5,136,837 A | * | 8/1992 | Davison | F02C 6/08 60/39.183 |
| 5,143,329 A | * | 9/1992 | Coffinberry | F02C 7/277 244/118.5 |
| 8,105,019 B2 | | 1/2012 | McCaffrey et al. | |
| 8,904,805 B2 | | 12/2014 | Hipsky et al. | |
| 8,967,528 B2 | | 3/2015 | Mackin et al. | |
| 2010/0326089 A1 | * | 12/2010 | Weber | F01D 17/145 60/783 |
| 2012/0247113 A1 | * | 10/2012 | Nenmeni | F01D 13/00 60/772 |
| 2016/0369705 A1 | * | 12/2016 | Mackin | F02C 6/08 |
| 2017/0241340 A1 | * | 8/2017 | Feulner | B64D 13/06 |
| 2017/0314420 A1 | * | 11/2017 | Bowan | F01K 25/02 |
| 2018/0057170 A1 | * | 3/2018 | Sautron | B64D 13/06 |

OTHER PUBLICATIONS

EP Application No. 17171127.8 Office Action dated Nov. 21, 2018, 6 pages.

* cited by examiner

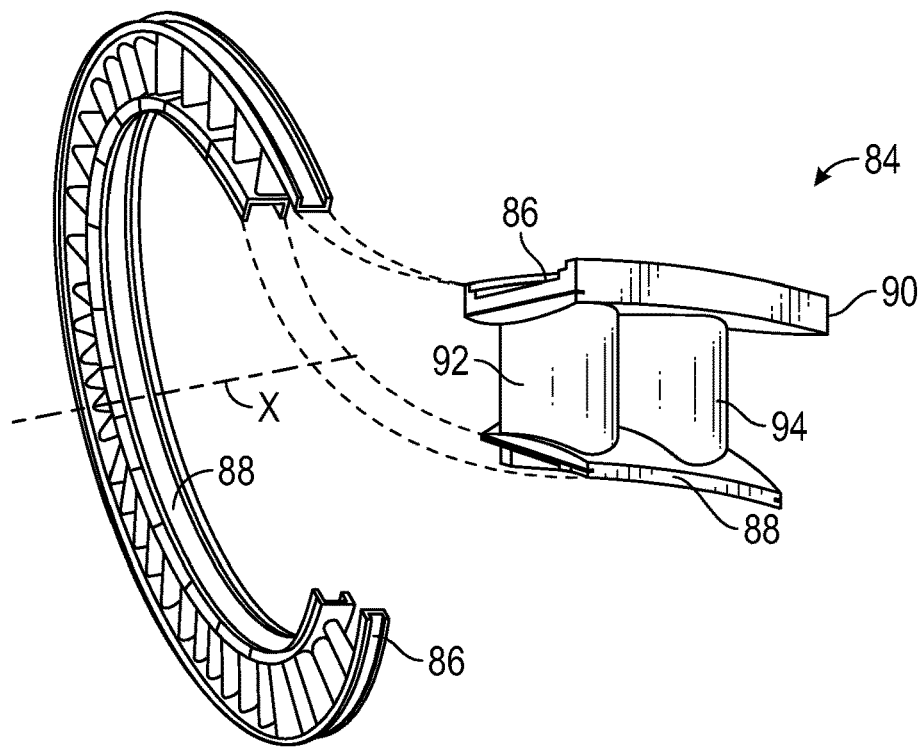

102
Control a plurality of valves in pneumatic ducting to direct an engine start air flow through an inlet of a variable area air turbine and drive rotation of a spool of the gas turbine engine during an engine start mode of operation 104
Direct an engine bleed air flow from a compressor section of the gas turbine engine through the inlet of the variable area air turbine to drive rotation of the spool during an environmental control system active mode of operation 106
Bypass the variable area air turbine with a portion of the engine bleed air flow when a wing anti-ice condition is present

FIG. 4

DUAL-USE AIR TURBINE SYSTEM FOR A GAS TURBINE ENGINE

BACKGROUND

This disclosure relates to gas turbine engines, and more particularly to a dual-use air turbine system for a gas turbine engine.

Gas turbine engines are used in numerous applications, one of which is for providing thrust to an aircraft. Compressed air is typically tapped at a high pressure location near the combustor for auxiliary uses, such as environmental control of the aircraft and wing anti-ice. However, this high pressure air is typically hotter than can safely be supported by ductwork and delivery to the aircraft. Thus, a pre-cooler or heat exchanger is used to cool high-temperature engine bleed air and is typically located near the engine such that excessively hot air is not ducted through the wing of the aircraft for safety reasons. Diverting higher pressure and higher temperature air from the engine beyond the pressure needed reduces engine efficiency.

BRIEF DESCRIPTION

According to an embodiment, a dual-use air turbine system for a gas turbine engine of an aircraft is provided. The dual-use air turbine system includes a variable area air turbine mechanically linked to a spool of the gas turbine engine through a multi-speed gear set. The dual-use air turbine system also includes a plurality of valves in pneumatic ducting operable to direct an engine start air flow through an inlet of the variable area air turbine and drive rotation of the spool during an engine start mode of operation. The valves are further operable to direct an engine bleed air flow from a compressor section of the gas turbine engine through the inlet of the variable area air turbine and drive rotation of the spool during an environmental control system active mode of operation.

In addition to one or more of the features described above, or as an alternative to any of the foregoing embodiments, further embodiments may include where the valves include a first check valve and a high pressure shutoff valve, and the engine bleed air flow is provided from a lower pressure tap of the compressor section by the first check valve or a higher pressure tap of the compressor section by the high pressure shut-off valve.

In addition to one or more of the features described above, or as an alternative to any of the foregoing embodiments, further embodiments may include where the first check valve is opened during a high power condition of the gas turbine engine and the high pressure shut-off valve is opened during an engine idle condition of the gas turbine engine.

In addition to one or more of the features described above, or as an alternative to any of the foregoing embodiments, further embodiments may include where the valves further include a main valve located upstream of the inlet of the variable area air turbine, a starter air valve located downstream of an outlet of the variable area air turbine, and a second check valve located between the outlet of the variable area air turbine and the main valve.

In addition to one or more of the features described above, or as an alternative to any of the foregoing embodiments, further embodiments may include where the main valve and the starter air valve are opened during the engine start mode of operation to establish a flow path from aircraft ducting through the main valve, the variable area air turbine, the starter air valve, and an exhaust port.

In addition to one or more of the features described above, or as an alternative to any of the foregoing embodiments, further embodiments may include where the starter air valve is opened during an environmental control system off mode of operation to establish a flow path for the engine bleed air flow through the variable area air turbine, the starter air valve, and an exhaust port.

In addition to one or more of the features described above, or as an alternative to any of the foregoing embodiments, further embodiments may include where the main valve is opened during the environmental control system active mode of operation at a minimum pressure engine idle condition to establish a flow path for the engine bleed air flow through the main valve to aircraft ducting.

In addition to one or more of the features described above, or as an alternative to any of the foregoing embodiments, further embodiments may include where the main valve is closed and the second check valve is opened during the environmental control system active mode of operation at an engine off idle condition and at a high power condition to establish a flow path for the engine bleed air flow through the variable area air turbine and the second check valve to aircraft ducting.

In addition to one or more of the features described above, or as an alternative to any of the foregoing embodiments, further embodiments may include where the main valve is opened and the second check valve is opened during the environmental control system active mode of operation with wing anti-ice on to establish a flow path for the engine bleed air flow to aircraft ducting through the variable area air turbine and the main valve.

In addition to one or more of the features described above, or as an alternative to any of the foregoing embodiments, further embodiments may include a clutch to selectively engage the variable area air turbine to drive rotation of the spool.

According to an embodiment, a method of using a dual-use air turbine system for a gas turbine engine of an aircraft is provided. The method includes controlling a plurality of valves in pneumatic ducting to direct an engine start air flow through an inlet of a variable area air turbine and drive rotation of a spool of the gas turbine engine during an engine start mode of operation. An engine bleed air flow is directed from a compressor section of the gas turbine engine through the inlet of the variable area air turbine to drive rotation of the spool during an environmental control system active mode of operation, where the variable area air turbine is mechanically linked to the spool of the gas turbine engine through a multi-speed gear set.

Technical effects include utilizing an air turbine for starting a gas turbine engine and to boost engine efficiency by reducing engine bleed air temperature before it enters the aircraft wing while converting the thermal energy back into rotational energy driving the engine.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

FIG. 3 is an expanded view of a vane portion of a turbine stage within the air turbine of FIGS. 2; and FIG. 4 is a process flow of a method according to embodiments of the disclosure.

Figure 1:
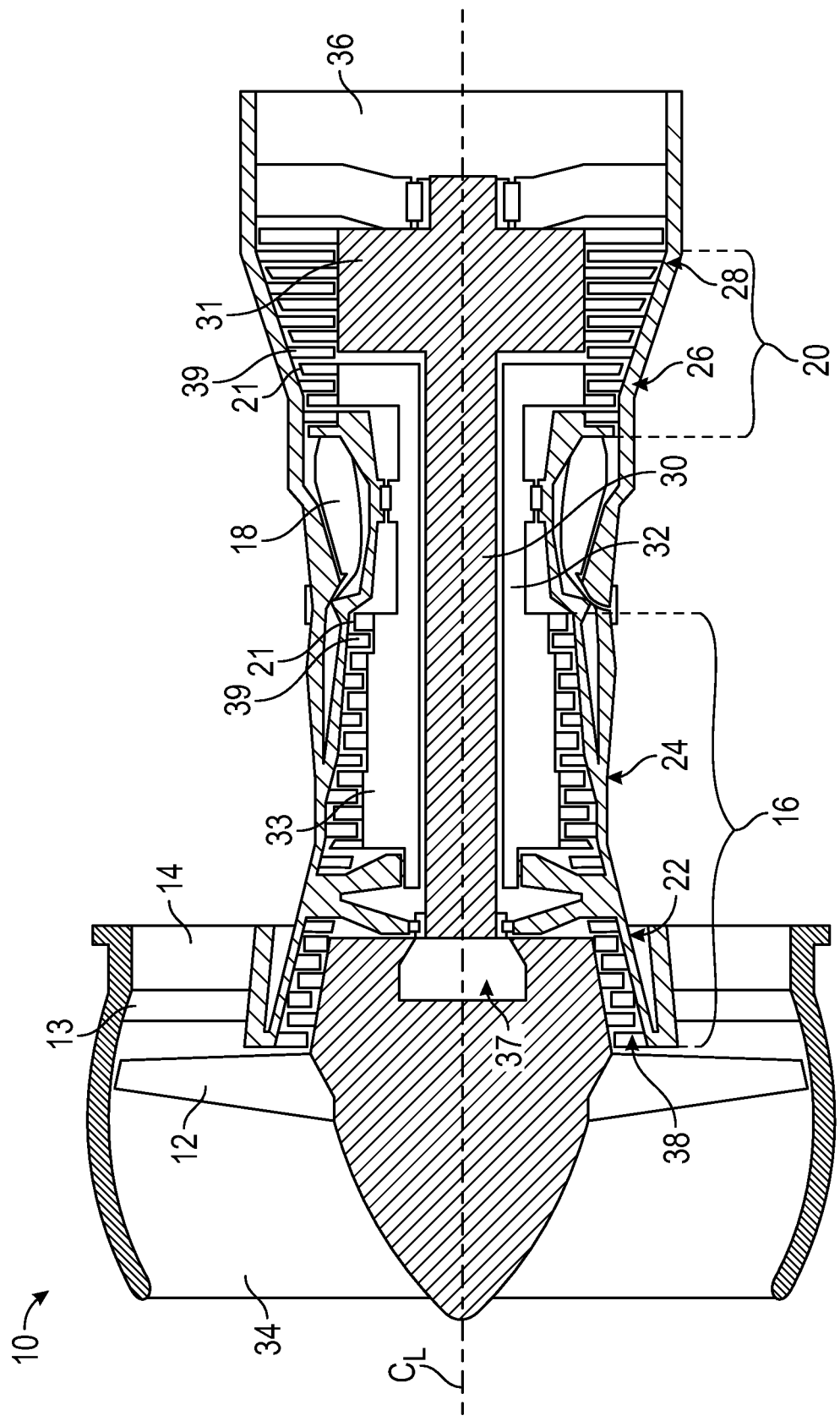
FIG. 1 is a cross-sectional view of a gas turbine engine.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope of the principles of the invention. The figures may not be drawn to scale, and applications and embodiments of the present disclosure may include features and components not specifically shown in the drawings. Like reference numerals identify similar structural elements.

DETAILED DESCRIPTION

Various embodiments of the present disclosure are related to a dual-use air turbine system for a gas turbine engine. Embodiments of this disclosure may be applied on any turbomachinery from which compressed air is tapped for auxiliary uses. For example, gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both. Compressed air can be extracted from various stages as bleed air.

Embodiments include a variable area air turbine that can be used for engine starting and cooling of higher temperature engine bleed air for aircraft environmental control systems. Rather than relying entirely on a pre-cooler/heat exchanger to cool engine bleed air, the variable area air turbine can provide cooling while returning rotational energy back to the engine. This can reduce sizing requirements and in some instances eliminate the need for a pre-cooler while increasing engine operating efficiency.

Gas turbine engines provide efficient, reliable power for a wide range of applications, including aviation and industrial power generation. Smaller-scale engines such as auxiliary power units typically utilize a one-spool design, with co-rotating compressor and turbine sections. Larger-scale jet engines and industrial gas turbines are generally arranged into a number of coaxially nested spools, which operate at different pressures and temperatures, and rotate at different speeds.

The individual compressor and turbine sections in each spool are subdivided into a number of stages, which are formed of alternating rows of rotor blades and stator vane airfoils. The airfoils are shaped to turn, accelerate and compress the working fluid flow, or to generate lift for conversion to rotational energy in the turbine.

Aviation applications include turbojet, turbofan, turboprop and turboshaft engines. In turbojet engines, thrust is generated primarily from the exhaust. Modern fixed-wing aircraft generally employ turbofan and turboprop designs, in which the low pressure spool is coupled to a propulsion fan or propeller in turbofan with two turbines. Alternatively, in turbofans with three turbines, one turbine drives the fan, one turbine drives the first compressor section and the third turbine drives the second compressor section. Turboshaft engines are typically used on rotary-wing aircraft, including helicopters.

Turbofan engines are commonly divided into high and low bypass configurations. High bypass turbofans generate thrust primarily from the fan, which drives airflow through a bypass duct oriented around the engine core. This design is common on commercial aircraft and military transports, where noise and fuel efficiency are primary concerns. Low bypass turbofans generate proportionally more thrust from the exhaust flow, providing greater specific thrust for use on high-performance aircraft, including supersonic jet fighters. Unducted (open rotor) turbofans and ducted propeller engines are also known, in a variety of counter-rotating and aft-mounted configurations.

Referring now to FIG. 1, a cross-sectional view of a gas turbine engine 10, in a turbofan configuration is illustrated. The illustrated gas turbine engine 10 includes a propulsion fan 12 mounted inside a bypass duct 14 upstream of a fan exit guide vane 13. A power core of the engine is formed by a compressor section 16, a combustor 18 and a turbine section 20. Rotor blades (or airfoils) 21 in the compressor section 16 and/or the turbine section 20 are arranged in stages 38 with corresponding stator vane airfoils 39.

In the two-spool, high bypass configuration of FIG. 1, compressor section 16 includes a low pressure compressor 22 (a lower pressure compressor section) and a high pressure compressor 24 (a highest pressure compressor section). The turbine section 20 includes high a pressure turbine 26 and a low pressure turbine 28.

The low pressure compressor 22 is rotationally coupled to the low pressure turbine 28 via a low pressure shaft 30, thereby forming the low pressure spool or low spool 31. High pressure compressor 24 is rotationally coupled to the high pressure turbine 26 via a high spool shaft 32, forming the high pressure spool or high spool 33.

During operation of the gas turbine engine 10, the fan 12 accelerates air flow from an inlet 34 through bypass duct 14, generating thrust. The core airflow is compressed in the low pressure compressor 22 and the high pressure compressor 24 and then the compressed airflow is mixed with fuel in the combustor 18 and ignited to generate combustion gas.

The combustion gas expands to drive the high and low pressure turbines 26 and 28, which are rotationally coupled to high pressure compressor 24 and low pressure compressor 22, respectively. Expanded combustion gases exit through exhaust nozzle 36, which is shaped to generate additional thrust from the exhaust gas flow. In advanced turbofan designs with a low pressure turbine and a high pressure turbine, the low pressure shaft 30 may be coupled to a low pressure compressor and then to a fan 12 via geared drive mechanism 37, providing improved fan speed control for increased efficiency and reduced engine noise. Propulsion fan 12 may also function as a first-stage compressor for gas turbine engine 10, with low pressure compressor 22 performing as an intermediate-stage compressor or booster in front of the high pressure compressor. Alternatively, the low pressure compressor stages are absent, and air from fan 12 is provided directly to high pressure compressor 24, or to an independently rotating intermediate compressor spool.

The gas turbine engine 10 may have a range of different shaft and spool geometries, including one-spool, two-spool and three-spool configurations, in both co-rotating and counter-rotating designs. Gas turbine engine 10 may also be configured as a low bypass turbofan, an open-rotor turbofan, a ducted or un-ducted propeller engine, or an industrial gas turbine.

Figure 2:
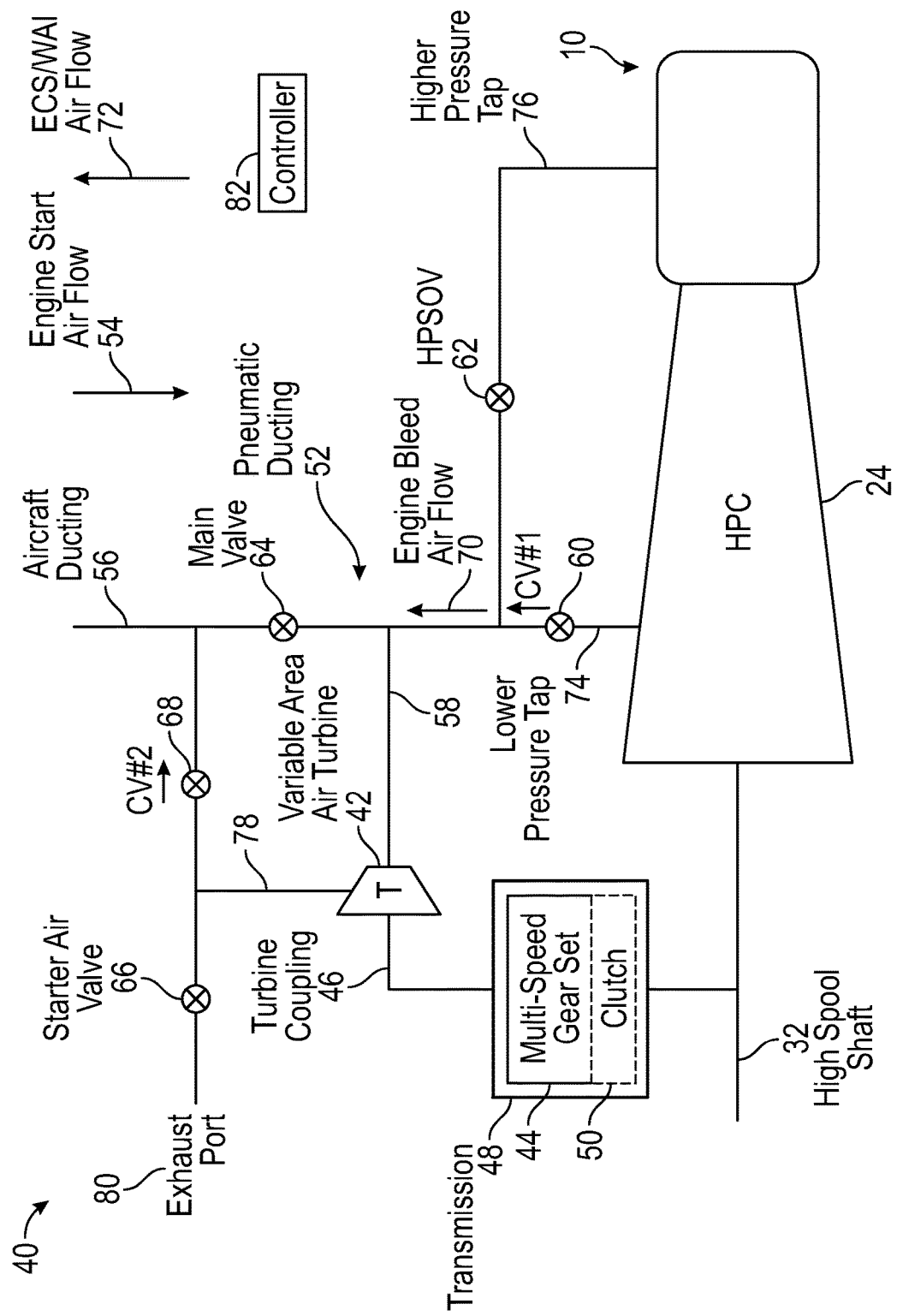
FIG. 2 is a schematic view of dual-use air turbine system according to an embodiment of the disclosure.

FIG. 2 depicts a dual-use air turbine system 40 that interfaces with elements of the gas turbine engine 10 of FIG. 1. The dual-use air turbine system 40 includes a variable area air turbine 42 mechanically linked to a spool (e.g., high spool 33) of the gas turbine engine 10 through a multi-speed gear set 44. A turbine coupling 46 links the variable area air turbine 42 through transmission 48 to high spool shaft 32. The transmission 48 can include the multi-speed gear set 44 and optionally a clutch 50 to selectively engage the variable area air turbine 42 to drive rotation of the spool. While a specific configuration is depicted in FIG. 2, other configurations are contemplated within the scope of embodiments. For instance, additional and/or alternate valve configurations can be incorporated in embodiments.

In the example of FIG. 2, a plurality of valves 60, 62, 64, 66, 68 in pneumatic ducting 52 can direct an engine start air flow 54 (from aircraft ducting 56) through an inlet 58 of the variable area air turbine 42 and drive rotation of the spool (e.g., high spool 33) during an engine start mode of operation when starting the gas turbine engine 10. The valves 60, 62, 64, 66, 68 are further operable to direct an engine bleed air flow 70 from a compressor section (e.g., high pressure compressor 24) of the gas turbine engine 10 through the inlet 58 of the variable area air turbine 42 and drive rotation of the spool (e.g., high spool 33) in combination with the rotational force provided by the high pressure turbine 26 during an environmental control system active mode of operation. The aircraft ducting 56 can provide the engine start air flow 54 from an auxiliary power unit, ground cart, or other sources (not depicted) when the gas turbine engine 10 is to be started. The aircraft ducting 56 can receive an environmental control system and/or wing anti-ice air flow 72 from the dual-use air turbine system 40 when the gas turbine engine 10 is running (e.g., at idle or higher power) and a need is detected. The environmental control system and/or wing anti-ice air flow 72 can be provided by the engine bleed air flow 70 directly and/or after all or a portion of the engine bleed air flow 70 has passed through the variable area air turbine 42 depending on the demand and current operating conditions.

The engine bleed air flow 70 can be provided from a lower pressure tap 74 of the high pressure compressor 24 by a first check valve 60. Alternatively, the engine bleed air flow 70 can be provided from a higher pressure tap 76 of the high pressure compressor 24 by a high pressure shut-off valve 62. The first check valve 60 is opened during a high power condition of the gas turbine engine 10, while the high pressure shut-off valve 62 is opened during an engine idle condition of the gas turbine engine 10. The higher pressure tap 76 can be used as the source for the engine bleed air flow 70 near idle and as power increases until the lower pressure tap 74 can provide a demanded temperature/pressure level.

A main valve 64 is located upstream of the inlet 58 of the variable area air turbine 42 and provides a flow path between the aircraft ducting 56 and the inlet 58 when open. The main valve 64 also provides a flow path for the engine bleed air flow 70 to the aircraft ducting 56 when open. A starter air valve 66 is located downstream of an outlet 78 of the variable area air turbine 42. The starter air valve 66 provides a flow path between outlet 78 and an exhaust port 80 (e.g., to a turbine exhaust case or overboard) when open. A second check valve 68 is located between the outlet 78 of the variable area air turbine 42 and the main valve 64. The second check valve 68 provides a flow path between the outlet 78 and the aircraft ducting 56 when open. The first check valve 60 and the second check valve 68 can be passively controlled based on the pressure differential on each side of each valve. The high pressure shutoff valve 62, main valve 64, and starter air valve 66 can be controlled by one or more controllers (depicted generally as controller 82).

The controller 82 may include memory to store instructions that are executed by a processor. The executable instructions may be stored or organized in any manner and at any level of abstraction, such as in connection with a controlling and/or monitoring operation of one or more systems of the gas turbine engine 10 of FIG. 1 and/or other aircraft systems. The processor can be any type of central processing unit (CPU), including a general purpose processor, a digital signal processor, a microcontroller, an application specific integrated circuit (ASIC), a field programmable gate array, or the like. Also, in embodiments, the memory may include random access memory (RAM), read only memory (ROM), or other electronic, optical, magnetic, or any other computer readable medium onto which is stored data and control algorithms in a non-transitory form. The controller 82 can be embodied in an individual line-replaceable unit, within a control system (e.g., in an electronic engine control), and/or distributed between multiple electronic systems.

The variable area air turbine 42 can be embodied in various forms known in the art having a variable area feature to alter flow characteristics through the variable area air turbine 42. As one example, the variable area air turbine 42 can include turbine nozzle segments 84 such as that depicted in FIG. 3. A turbine nozzle segment 84 includes an arcuate outer vane platform segment 86 and an arcuate inner vane platform segment 88 radially spaced apart from each other. The arcuate outer vane platform segment 86 may form an outer portion of the variable area air turbine 42 and the arcuate inner vane platform segment 88 may form an inner portion of variable area air turbine 42 to at least partially define an annular turbine nozzle flow path.

The circumferentially adjacent vane platform segments 86, 88 define split lines 90 which thermally uncouple adjacent turbine nozzle segments 84 which may be conventionally sealed therebetween, with, for example only, spline seals. That is, the temperature environment of the variable area air turbine 42 and the substantial aerodynamic and thermal loads are accommodated by the plurality of circumferentially adjoining nozzle segments 84 which collectively form a full, annular ring about a centerline axis X of the variable area air turbine 42.

Each turbine nozzle segment 84 includes a multiple (two shown) of circumferentially spaced apart turbine vanes 92, 94 which extend radially between the vane platform segments 86, 88. In the disclosed embodiment, each nozzle segment 84 (doublet) includes one fixed turbine vane 92 and one rotational turbine vane 94 between the vane platform segments 86, 88 to provide a rigid structural assembly which accommodates thermal and aerodynamic loads during operation. That is, the full, annular ring formed by the multiple of turbine nozzle segments 84 provides a vane portion of one stage in the variable area air turbine 42, which is defined by the alternating fixed and rotational turbine vanes 92, 94 in this example. Rotational turbine vane 94 movement results in a variable flow area to increase or choke flow through the variable area air turbine 42 as needed.

FIG. 4 is a process flow of a method 100 of using the dual-use air turbine system 40 of FIG. 2 according to an embodiment. The method 100 is described with reference to FIGS. 1-3. Although described primarily in reference to the gas turbine engine 10 of FIG. 1, it will be understood that the method 100 can also be applied to other configurations. At block 102, valves 60, 62, 64, 66, 68 in pneumatic ducting 52 are controlled (e.g., by controller 82 and/or pressure differentials) to direct engine start air flow 54 through inlet 58 of variable area air turbine 42 and drive rotation of a spool (e.g., high spool 33) of the gas turbine engine 10 during an engine start mode of operation. At block 104, engine bleed air flow 70 is directed from a compressor section (e.g., high pressure compressor 24) of the gas turbine engine 10 through the inlet 58 of the variable area air turbine 42 to drive rotation of the spool during an environmental control system active mode of operation. In the environmental control system active mode of operation, rotational force driven by the variable area air turbine 42 can supplement the rotational force provided by the high pressure turbine 26 in driving rotation of the high spool shaft 32. At block 106, a portion of the engine bleed air flow 70 bypasses the variable area air turbine 42 when a wing anti-ice condition is present.

Various operating conditions are contemplated. For example, the first check valve 60 can be opened during a high power condition of the gas turbine engine 10, and the high pressure shut-off valve 62 can be opened during an engine idle condition of the gas turbine engine 10. The main valve 64 and the starter air valve 66 can be opened during the engine start mode of operation to establish a flow path from aircraft ducting 56 through the main valve 64, the variable area air turbine 42, the starter air valve 66, and the exhaust port 80. The starter air valve 66 can be opened during an environmental control system off mode of operation to establish a flow path for the engine bleed air flow 70 through the variable area air turbine 42, the starter air valve 66, and the exhaust port 80. The main valve 64 can be opened during the environmental control system active mode of operation at a minimum pressure engine idle condition to establish a flow path for the engine bleed air flow 70 through the main valve 64 to the aircraft ducting 56. The main valve 64 can be closed and the second check valve 68 can be opened during the environmental control system active mode of operation at an engine off idle condition and at a high power condition to establish a flow path for the engine bleed air flow 70 through the variable area air turbine 42 and the second check valve 68 to the aircraft ducting 56. The main valve 64 can be opened and the second check valve 68 can be opened during the environmental control system active mode of operation with wing anti-ice on to establish a flow path for the engine bleed air flow 70 to the aircraft ducting 56 through the variable area air turbine 42 and the main valve 64. Depending on the operating conditions, the variable area air turbine 42 can be selectively engaged or disengaged with the high spool shaft 32 to drive rotation of the high spool 33 during start and during environmental control system operation While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A dual-use air turbine system for a gas turbine engine of an aircraft, the dual-use air turbine system comprising:
   a variable area air turbine mechanically linked to a spool of the gas turbine engine through a multi-speed gear set;
   a plurality of valves in pneumatic ducting operable to direct an engine start air flow through an inlet of the variable area air turbine and drive rotation of the spool during an engine start mode of operation, wherein the valves comprise a first check valve, a high pressure shutoff valve, a main valve located upstream of the inlet of the variable area air turbine, a starter air valve located downstream of an outlet of the variable area air turbine, and a second check valve located between the outlet of the variable area air turbine and the main valve; and
   a controller configured to direct an engine bleed air flow from a compressor section of the gas turbine engine through the inlet of the variable area air turbine and drive rotation of the spool during an environmental control system active mode of operation of an environmental control system that provides conditioned air to a cabin of the aircraft, wherein the engine bleed air flow is provided from a lower pressure tap of the compressor section by the first check valve to the main valve and to the inlet of the variable area air turbine or the engine bleed air flow is provided from a higher pressure tap of the compressor section by the high pressure shut-off valve to the main valve and the inlet of the variable area air turbine.

2. The dual-use air turbine system as in claim 1, wherein the controller is further configured to open the first check valve during a high power condition of the gas turbine engine and open the high pressure shut-off valve during an engine idle condition of the gas turbine engine.

3. The dual-use air turbine system as in claim 1, wherein the controller is configured to open the main valve and the starter air valve during the engine start mode of operation to establish a flow path from aircraft ducting through the main valve, the variable area air turbine, the starter air valve, and an exhaust port.

4. The dual-use air turbine system as in claim 1, wherein the controller is configured to open the starter air valve during an environmental control system off mode of operation to establish a flow path for the engine bleed air flow through the variable area air turbine, the starter air valve, and an exhaust port.

5. The dual-use air turbine system as in claim 1, wherein the controller is configured to open the main valve during the environmental control system active mode of operation at a minimum pressure engine idle condition to establish a flow path for the engine bleed air flow through the main valve to aircraft ducting.

6. The dual-use air turbine system as in claim 1, wherein the controller is configured to close the main valve and open the second check valve during the environmental control system active mode of operation at an engine off idle condition and at a high power condition to establish a flow path for the engine bleed air flow through the variable area air turbine and the second check valve to aircraft ducting.

7. The dual-use air turbine system as in claim 1, wherein the controller is configured to open the main valve and open the second check valve during the environmental control system active mode of operation with a wing anti-ice air flow on to establish a flow path for the engine bleed air flow to aircraft ducting through the variable area air turbine and the main valve to provide heated air to a wing of the aircraft.

8. The dual-use air turbine system as in claim 1, further comprising a clutch to selectively engage the variable area air turbine to drive rotation of the spool.

9. A method of using a dual-use air turbine system for a gas turbine engine of an aircraft, the method comprising:
controlling a plurality of valves in pneumatic ducting to direct an engine start air flow through an inlet of a variable area air turbine and drive rotation of a spool of the gas turbine engine during an engine start mode of operation, wherein the valves comprise a first check valve, a high pressure shutoff valve, a main valve located upstream of the inlet of the variable area air turbine, a starter air valve located downstream of an outlet of the variable area air turbine, and a second check valve located between the outlet of the variable area air turbine and the main valve; and
directing an engine bleed air flow from a compressor section of the gas turbine engine through the inlet of the variable area air turbine to drive rotation of the spool during an environmental control system active mode of operation of an environmental control system that provides conditioned air to a cabin of the aircraft, wherein the engine bleed air flow is provided from a lower pressure tap of the compressor section by the first check valve to the main valve and to the inlet of the variable area air turbine or the engine bleed air flow is provided from a higher pressure tap of the compressor section by the high pressure shut-off valve to the main valve and the inlet of the variable area air turbine, wherein the variable area air turbine is mechanically linked to the spool of the gas turbine engine through a multi-speed gear set.

10. The method as in claim 9, further comprising:
opening the first check valve during a high power condition of the gas turbine engine; and
opening the high pressure shut-off valve during an engine idle condition of the gas turbine engine.

11. The method as in claim 9, further comprising:
opening the main valve and the starter air valve during the engine start mode of operation to establish a flow path from aircraft ducting through the main valve, the variable area air turbine, the starter air valve, and an exhaust port.

12. The method as in claim 9, further comprising:
opening the starter air valve during an environmental control system off mode of operation to establish a flow path for the engine bleed air flow through the variable area air turbine, the starter air valve, and an exhaust port.

13. The method as in claim 9, further comprising:
opening the main valve during the environmental control system active mode of operation at a minimum pressure engine idle condition to establish a flow path for the engine bleed air flow through the main valve to aircraft ducting.

14. The method as in claim 9, further comprising:
closing the main valve and opening the second check valve during the environmental control system active mode of operation at an engine off idle condition and at a high power condition to establish a flow path for the engine bleed air flow through the variable area air turbine and the second check valve to aircraft ducting.

15. The method as in claim 9, further comprising:
opening the main valve and opening the second check valve during the environmental control system active mode of operation with a wing anti-ice air flow on to establish a flow path for the engine bleed air flow to aircraft ducting through the variable area air turbine and the main valve to provide heated air to a wing of the aircraft.

16. The method as in claim 9, further comprising selectively engaging the variable area air turbine to drive rotation of the spool.

* * * * *